(12) United States Patent
   Patel et al.

(10) Patent No.: US 12,659,844 B2
(45) Date of Patent: Jun. 16, 2026

(54) SYSTEMS AND METHODS FOR NETWORK SLICE INDICATOR

(71) Applicant: Verizon Patent and Licensing Inc., Basking Ridge, NJ (US)

(72) Inventors: Samirkumar Patel, Middlesex, NJ (US); Andrew E. Youtz, Princeton, NJ (US); Jeremy Nacer, Boca Raton, FL (US); Lily Zhu, Parsippany, NJ (US); Bharadwaj Vemuri, Bear, DE (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 433 days.

(21) Appl. No.: 18/186,266

(22) Filed: Mar. 20, 2023

(65) Prior Publication Data

US 2024/0323817 A1     Sep. 26, 2024

(51) Int. Cl.
   *H04W 48/16*       (2009.01)
(52) U.S. Cl.
   CPC .................................... *H04W 48/16* (2013.01)
(58) Field of Classification Search
   CPC ...................................................... H04W 48/16

USPC .......................................................... 455/434
See application file for complete search history.

(56) References Cited

U.S. PATENT DOCUMENTS

| | | | |
|---|---|---|---|
| 2021/0203581 A1* | 7/2021 | He ....................... | H04L 43/0882 |
| 2022/0400461 A1* | 12/2022 | Nayak ................... | H04W 48/02 |

* cited by examiner

*Primary Examiner* — Chuck Huynh

(57) ABSTRACT

A device, such as a User Equipment ("UE"), may identify that the device is communicatively coupled to a wireless network via a particular network slice. The particular network slice may be associated with a particular set of Quality of Service ("QoS") parameters, Service Level Agreements ("SLAs"), or the like. The UE may determine the particular network slice based on a slice identifier provided by a network interface of the device, based on attributes of traffic sent or received via the wireless network, and/or based on attributes of a wireless connection between the device and the wireless network. The device may identify a slice indicator associated with the particular network slice, and may present the slice indicator via a user interface of the device. The presented slice indicator may notify a user of the device that the particular network slice is being used for traffic sent or received via the device.

20 Claims, 9 Drawing Sheets

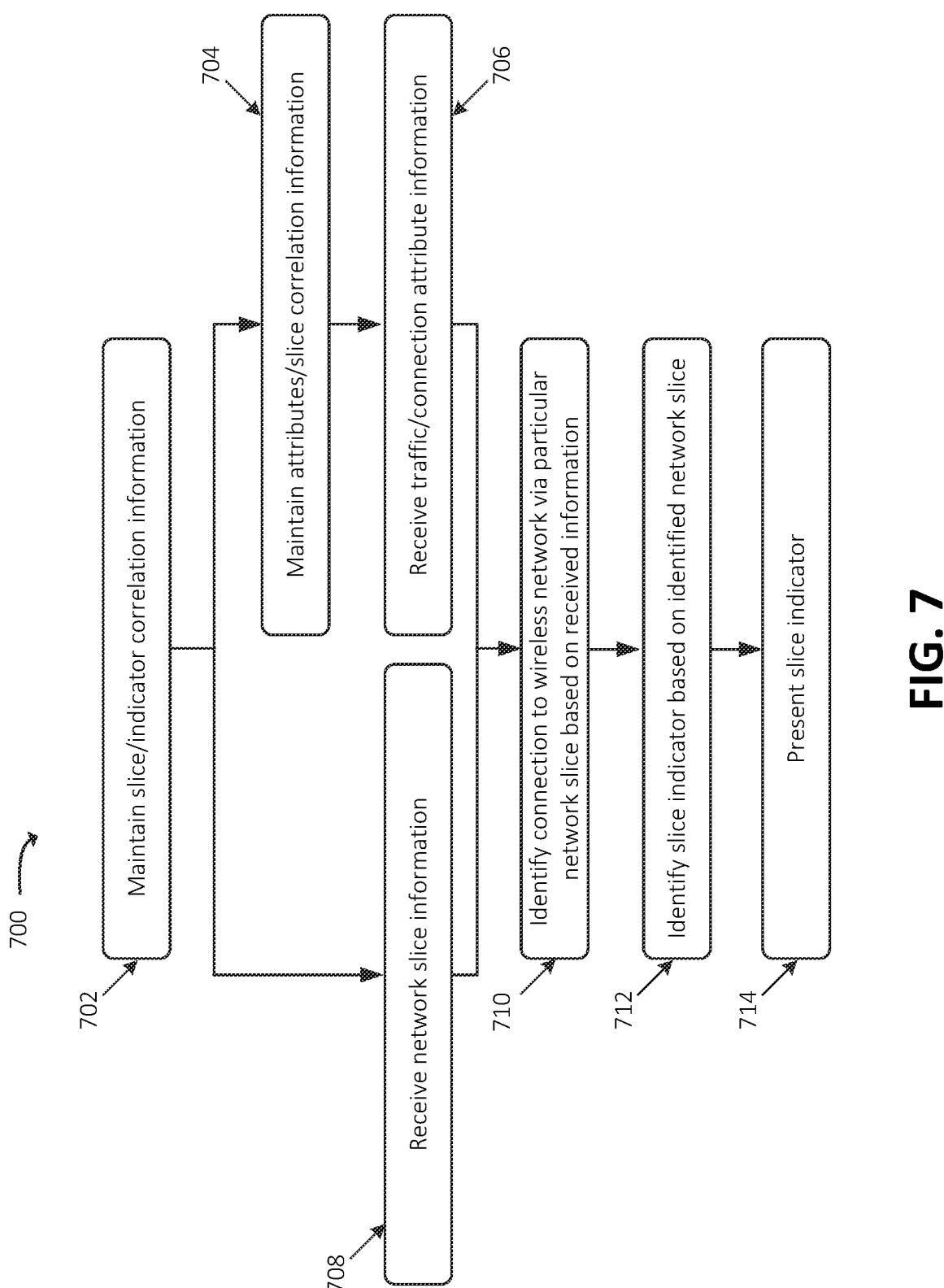

700

702 — Maintain slice/indicator correlation information

704 — Maintain attributes/slice correlation information

706 — Receive traffic/connection attribute information

708 — Receive network slice information

710 — Identify connection to wireless network via particular network slice based on received information 712 — Identify slice indicator based on identified network slice 714 — Present slice indicator

SYSTEMS AND METHODS FOR NETWORK SLICE INDICATOR

BACKGROUND

Wireless networks may provide connectivity to User Equipment ("UEs"), such as mobile phones, tablets, Internet of Things ("IoT") devices, or the like. Wireless networks may include various network slices, via which the wireless networks may provide differing levels of Quality of Service ("QoS") to UEs. The differing levels of QoS may be provided based on, for example, particular categories or classes of UEs (e.g., "first responder" UEs, "enterprise" UEs, etc.), different application or service types (e.g., voice calls, content streaming, etc.), and/or on some other basis.

BRIEF DESCRIPTION OF THE DRAWINGS

FIG. 7 illustrates an example process for presenting a slice indicator indicating a particular network slice with which a given UE is associated, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for a network slice indicator to be provided via UEs receiving service from a wireless network. The network slice indicator may be presented, for example, via a graphical user interface ("GUI") of a given UE (e.g., in a notification panel, in a system tray, in a taskbar, etc.), such that a user of the UE may be readily able to discern aspects of service provided to the UE, such as whether the UE is communicating with the network via a particular network slice, and/or via which network slice(s) the UE is communicating with the network. The user may have, for example, subscribed to a premium subscription via which enhanced services are associated (e.g., a "low latency gaming" subscription, a "high bandwidth streaming" subscription, etc.), and the network may provide such enhanced services using network slicing and/or other techniques. Providing the network slice indicator, in accordance with some embodiments, may provide confirmation to the user that subscriptions, Service Level Agreements ("SLAs"), etc. are being fulfilled by the network, and may therefore improve the user experience.

Figure 1A:
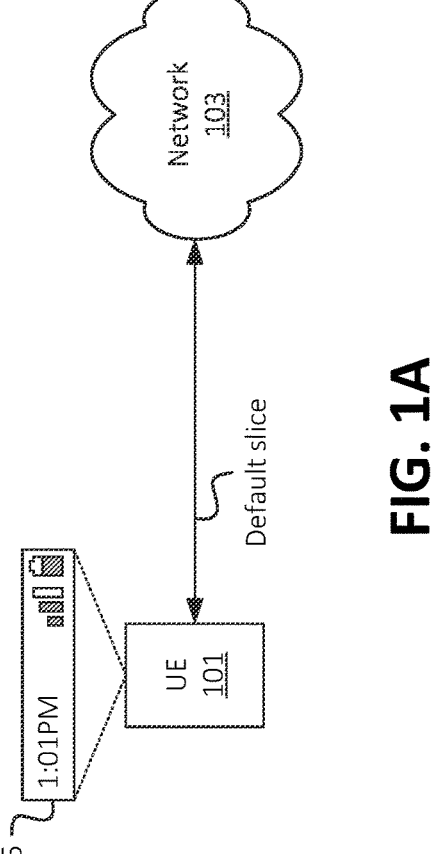
FIGS. 1A and 1B illustrate an example overview of one or more embodiments described herein.

As shown in FIG. 1A, a particular UE 101 may be connected to a particular network 103. Network 103 may be, may include, and/or may be communicatively coupled to a wireless network, such as a Fifth Generation ("5G") network, an Long-Term Evolution ("LTE") network, and/or some other type of wireless network. In some embodiments, network 103 may include and/or may be communicatively coupled to a RAN, such as a 5G RAN, an LTE RAN, and/or some other type of RAN. The RAN may serve as a wireless interface between UE 101 and a core network (e.g., which may be implemented by, may be included in, and/or may be communicatively coupled to network 103), such as a 5G core ("5GC"), an Evolved Packet Core ("EPC"), a converged packet core (e.g., in which certain elements of the 5GC and EPC may be combined or implemented by the same elements), and/or some other type of core network. In some embodiments, network 103 may implement a 5G standalone ("SA") architecture, in which a 5G RAN is communicatively coupled to a 5GC. In some embodiments, network 103 may include a 5G non-standalone ("NSA") architecture, in which 5G and/or LTE RAN elements may be communicatively coupled to a 5GC, an EPC, and/or some combination thereof.

In the example of FIG. 1A, UE 101 may be connected to network 103 via a particular network slice, such as a "default" network slice. The default network slice may refer to a network slice that is established between UE 101 and network 103 during an initial connection procedure, that is used for certain types of services (e.g., web browsing, instant messaging, etc.), and/or that is otherwise established between UE 101 and network 103. The default slice may be associated with one or more communication sessions between UE 101 and network 103, such as a protocol data unit ("PDU") session or other type of communication session. Elements of network 103 may treat traffic, associated with UE 101 (e.g., to be sent to and/or received from UE 101) according to QoS parameters associated with the default slice.

As shown, a user interface ("UI") of UE 101 (e.g., UI 105, which may be a GUI or some other type of UI) may include icons, notifications, and/or other information. For example, UI 105 may include a clock, a network connectivity quality indicator (e.g., a "number of bars" of wireless service), a battery indicator, and/or other suitable information. In some embodiments, as similarly discussed above, UI 105 may include a notification panel, a taskbar, etc. of UE 101. UI 105 may, in some embodiments, be a native element of an operating system or "launcher" of UE 101. In some embodiments, UI 105 may be an element of an application executing at UE 101 (e.g., other than an operating system or launcher of UE 101). In this example, in accordance with some embodiments, based on the connection between UE 101 and network 103 via the default slice, UI 105 may not include a network slice indicator. That is, in some embodiments, UE 101 may be configured not to provide a network slice indicator unless UE 101 is connected to network 103 via a given network slice (e.g., a high priority network slice, a network slice other than the default network slice, etc.). Additionally, or alternatively, UE 101 may be configured not to provide a network slice indicator when UE 101 is only connected to network 103 via a given network slice, such as a default network slice. As discussed below, UE 101 may provide (e.g., via UI 105) other types of network slice or service indicators, such as indicators of a default network slice, indicators of multiple network slices, and/or other types of indicators.

Figure 1B:
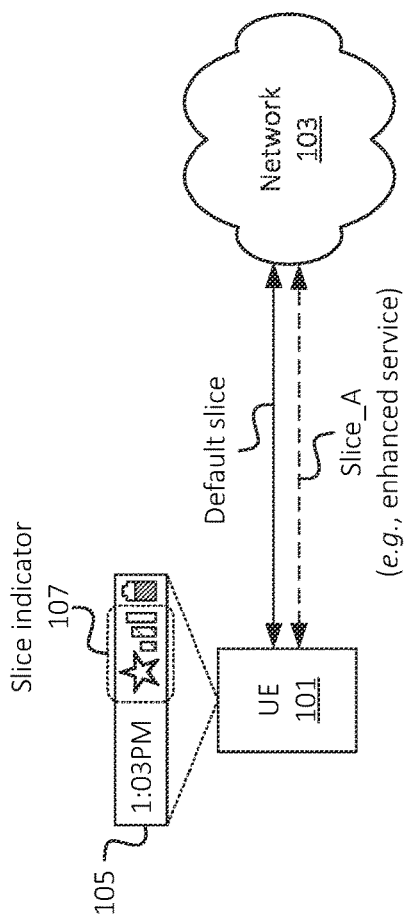

As shown in FIG. 1B, UE 101 may communicate with network 103 via a particular network slice, represented as "Slice_A." Although represented herein as "Slice_A," "Slice_B," etc., in practice different network slices may be referred to using Network Slice Selection Assistance Information ("NSSAI") values or other suitable network slice identifiers. The particular network slice (e.g., Slice_A, in this example) may be associated with enhanced services and/or otherwise different QoS parameters, SLAs, etc. than the default slice. For example, the particular network slice may be associated with low latency services (e.g., a network slice associated with Ultra-Reliable Low Latency Communications ("URLLC") services), high throughput services, high reliability services, and/or other services that differ from the default slice. UE 101 may, for example, establish one or more communication sessions with a core of network 103, such as a protocol data unit ("PDU") session, that are associated with Slice_A. The communication session (or sessions) associated with Slice_A may be established in addition to one or more communication sessions associated with the default network slice or some other network slice. That is, in some embodiments, UE 101 may have multiple communication sessions active between UE 101 and network 103, which may be associated with multiple different network slices.

Figure 3:
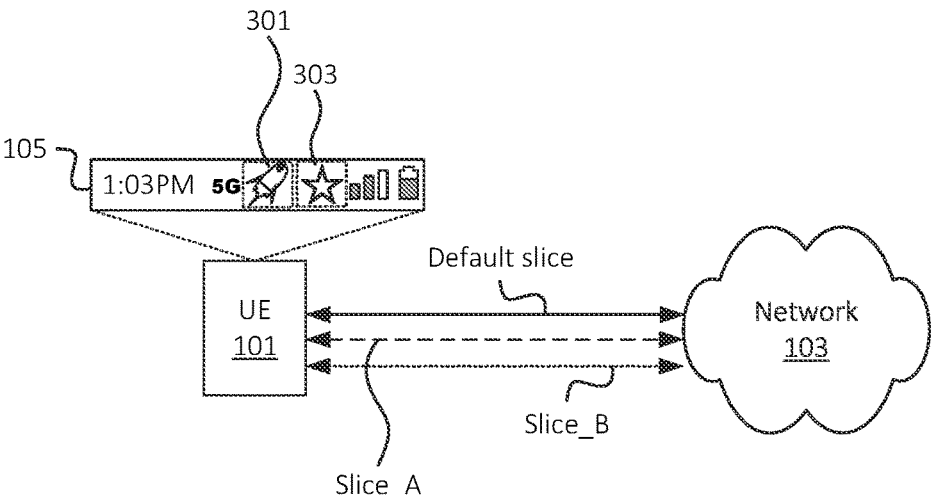
Figure 4:
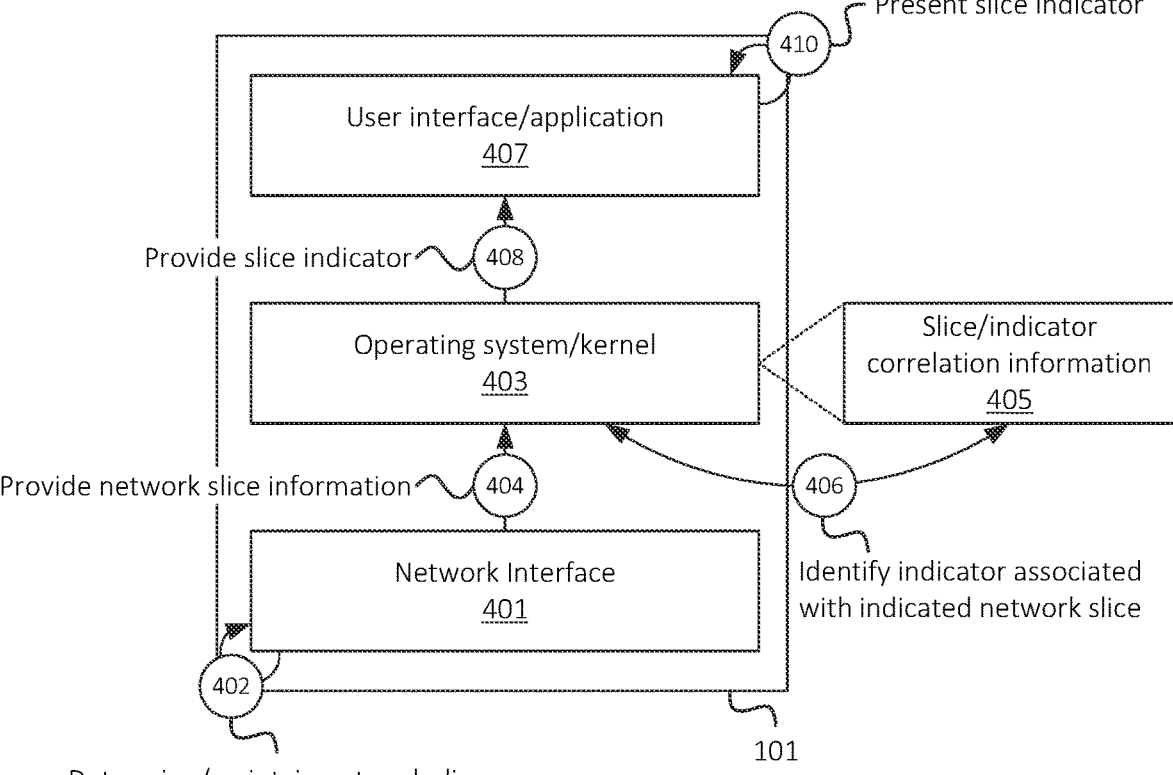
FIGS. 4 and 5 illustrate examples of a UE determining the connection of the UE to a wireless network via a particular network slice, and presenting one or more suitable slice indicators, in accordance with some embodiments.
Figure 5:
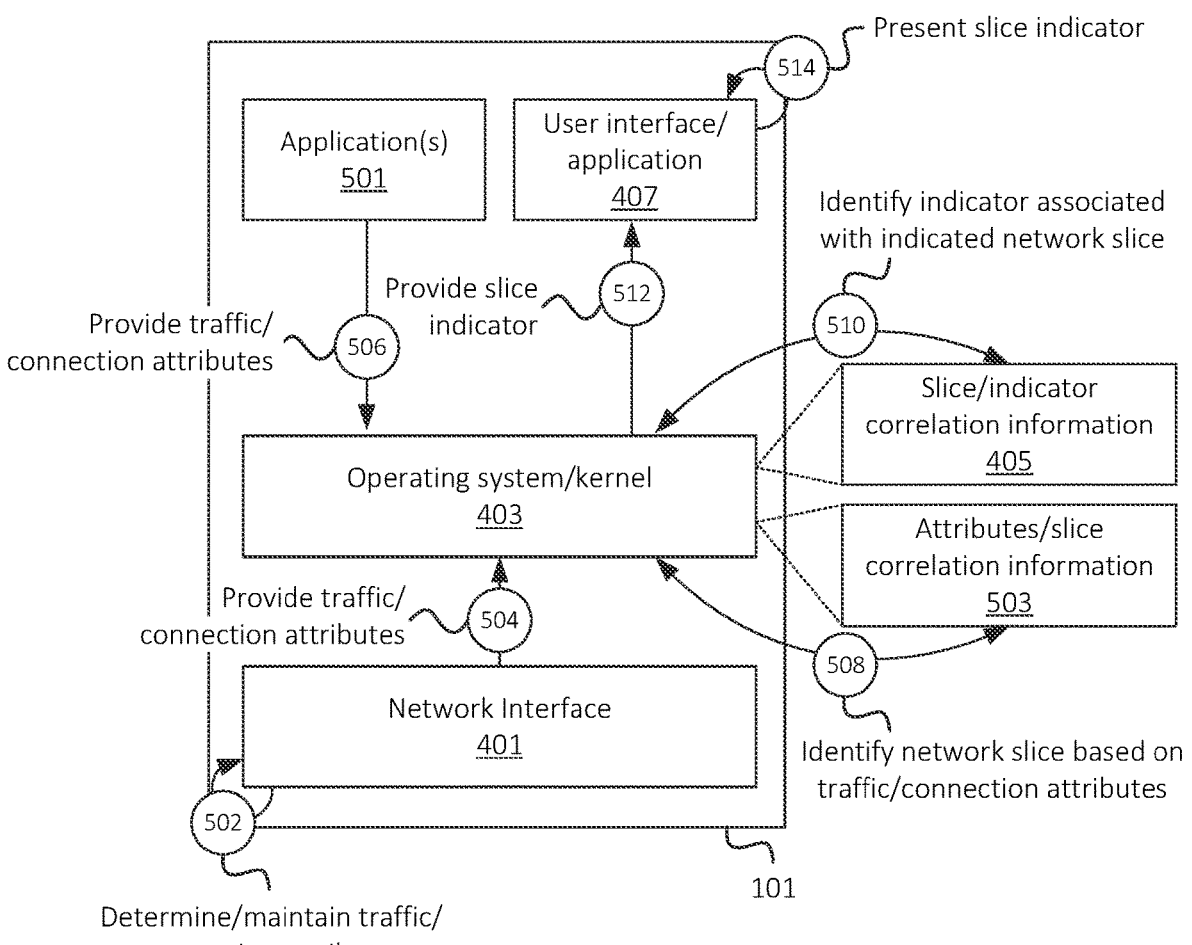

Based on the communication session between UE 101 and network 103 that is associated with Slice_A, UE 101 may present (e.g., via UI 105) slice indicator 107 that indicates that UE 101 is communicating with network 103 via Slice_A. For example, slice indicator 107 may include an icon or graphic (e.g., a star as shown in FIG. 1B). Additionally, or alternatively, slice indicator 107 may include a modification of another graphical element in UI 105, such as the "bars" indicating wireless quality. For example, as shown in FIG. 1B, the bars may be shaded differently (e.g., a different color) and/or may otherwise be visually different as compared to when UE 101 is not connected via the particular network slice (e.g., as shown in FIG. 1A). In some embodiments, other types of icons, indicators, etc. (e.g., a persistent notification, a pop-up message, etc.) may be used by UE 101 to present an indication to a user of UE 101 that UE 101 has connected to network 103 via the particular network slice. FIGS. 3-5, discussed below, provide examples in accordance with some embodiments of how UE 101 may determine the connection of UE 101 to network 103 via the particular network slice and/or how UE 101 may determine the manner in which slice indicator 107 should be presented (e.g., a particular icon, shading, etc.).

Figure 2:
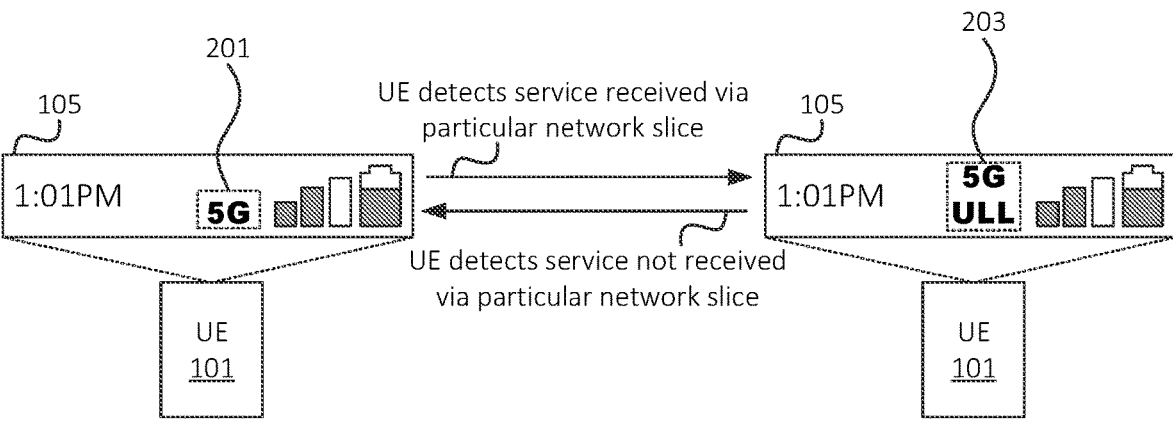
FIGS. 2 and 3 illustrate example network slice indicators, in accordance with some embodiments.

FIGS. 2 and 3 illustrate other example network slice indicators that may be used to indicate the connection between UE 101 and network 103 via one or more particular network slices. As shown in FIG. 2, UE 101 may be connected to network 103 via a default network slice, or may otherwise not be connected to network 103 via a particular network slice (e.g., may not be connected to network 103 via a network slice that is associated with a network slice indicator). The particular network slice referred to in this example may be an ultra-low latency ("ULL") network slice. In practice the particular network slice may be some other type of network slice. Accordingly, UE 101 may present (e.g., via UI 105) a first indicator 201, which may not indicate the particular network slice. Indicator 201 may indicate, for example, a RAT or band (e.g., a 5G RAT) via which UE 101 is connected to network 103 (e.g., connected to a RAN of network 103).

On the other hand, when UE 101 detects that UE 101 is connected to network 103 via the particular network slice, UE 101 may present (e.g., via UI 105) slice indicator 203, which may indicate that UE 101 is connected to network 103 via the particular network slice. In this example, slice indicator 203 may include a name, description, or other identifier of the particular network slice (e.g., "ULL"). As mentioned above, slice indicator 203 may, additionally, or alternatively, include an icon, graphic, or other type of indicator. In some embodiments, slice indicator 203 may include, may be based on, may be combined with, and/or may otherwise be associated with indicator 201 and/or some other element of UI 105. For example, as shown, slice indicator 203 may include the identifiers "5G" and "ULL," indicating both a RAT and a network slice used by UE 101 to connect to network 103. In practice, slice indicator 203 may be independent or separate from, and/or may otherwise not be associated with or derived from, another element of UI 105 such as indicator 201. In situations where UE 101 detects that UE 101 is no longer connected to network 103 via the particular network slice, UE 101 may remove slice indicator 203 from UI 105, which may include presenting indicator 201 but not slice indicator 203, or other suitable operations.

As shown in FIG. 3, UE 101 may present (e.g., via UI 105) multiple indicators associated with multiple network slices. For example, as shown, UE 101 may connect to network 103 via multiple network slices, such as a default network slice, Slice_A, and Slice_B. In some embodiments, UE 101 may present a first slice indicator 301, associated with the first network slice (e.g., Slice_A), and may present a second slice indicator 303, associated with the second network slice (e.g., Slice_B). Slice indicators 301 and 303 may be different, such as different icons or graphics, different text, etc. As such, a user of UE 101 may be notified in situations where UE 101 is utilizing multiple different network slices at once, such as situations where UE 101 is simultaneously accessing multiple different types of services (e.g., a low-latency gaming service, a high-throughput file upload service, etc.).

FIG. 4 illustrates an example of UE 101 determining the connection of UE 101 to network 103 via a particular network slice, and presenting one or more suitable slice indicators based on such determination. As shown, UE 101 may include network interface 401, which may include a modem, circuitry, radios, antennas, etc. that communicate with network 103. UE 101 may, for example, send and/or receive wireless traffic to and/or from network 103 (e.g., via a RAN of network 103) via network interface 401. As shown, network interface 401 may determine and/or maintain (at 402) information indicating network slices via which UE 101 communicates with network 103. For example, network interface 401 may maintain NSSAI values or other suitable information indicating network slices of communication sessions between UE 101 and network 103.

In accordance with some embodiments, network interface 401 may provide (at 404) information indicating the network slices to an operating system ("OS") and/or kernel (e.g., OS/kernel 403) of UE 101. For example, network interface 401 and/or OS/kernel 403 may implement an application programming interface ("API") or other suitable communication pathway via which network interface 401 provides network slice information to OS/kernel 403. Network interface 401 may, in some embodiments, "push" network slice information to OS/kernel 403 (e.g., whenever a communication session is established or removed), such that OS/kernel 403 is notified when UE 101 connects to network 103 via a given network slice, or when UE 101 is no longer connected to network 103 via a given network slice. Additionally, or alternatively, OS/kernel 403 may "pull" network slice information from network interface 401, such as by periodically or intermittently requesting network slice information from network interface 401.

Although discussed in the context of OS/kernel 403 performing the operations discussed herein, OS/kernel 403 may, in some embodiments perform some of the operations described herein and another application or device (e.g., an application executing at UE 101, a remote device, etc.) may perform other operations described herein. For example, while OS/kernel 403 is described below as maintaining or refining models, determining a network slice based on such models, identifying a respective slice associated with a given network slice, and/or performing other operations, in some embodiments some other application or device may perform such operations. In such embodiments, OS/kernel 403 may serve as an interface via which respective information is provided in order to provide for the operations described herein. For example, discussions of OS/kernel 403 "providing" information to a given resource may be refer to embodiments in which another application of UE 101 provides the information to OS/kernel 403, and OS/kernel 403 passes the information to the given resource. Similarly, discussions of OS/kernel 403 "receiving" information from a given source may refer to embodiments in which the source provides the information to OS/kernel 403 and OS/kernel 403 passes the information to an application executing at UE 101. As a further example, discussions of OS/kernel 403 "determining" information may be refer to embodiments in which another application executing at UE 101 determines such information.

OS/kernel 403 may identify (at 406) one or more slice indicators associated with the network slice (or slices) with which UE 101 is associated (e.g., via which UE 101 communicates with network 103). For example, OS/kernel 403 may receive or maintain slice/indicator correlation information 405 that associates particular network slices with particular slice indicators. Slice/indicator correlation information 405 may, for example, include names, identifiers, NSSAI values, etc. associated with respective network slices, as well as associations between such network slices and particular slice indicators (e.g., graphics, icons, text, etc.).

OS/kernel 403 may accordingly provide (at 408) identified slice indicators to UI/application 407. For example, user interface/application 407 may include a UI presentation component of OS/kernel 403, which may present a notification panel, a pop-up notification, and/or other system-level UI via UE 101. Additionally, or alternatively, user interface/application 407 may include an application, such as a gaming application, a voice call application, and/or some other type of application (e.g., which may communicate (at 408) with OS/kernel 403 via an API or other suitable communication pathway). User interface/application 407 may accordingly present (at 410) the received slice indicator, such as via UE 105 or in some other suitable manner.

FIG. 5 illustrates another example of UE 101 determining the connection of UE 101 to network 103 via a particular network slice, and presenting one or more suitable slice indicators based on such determination. In the example of FIG. 5, network interface 401 may not directly provide an indication of the particular network slices that UE 101 is associated with. For example, network interface 401 may not implement an API or other mechanism by which network slice information is available to OS/kernel 403. As such, UE 101 may determine the network slices based on other information, as discussed below.

As shown, network interface 401 may determine and/or maintain (at 502) attributes of traffic sent and/or received by UE 101 and/or of connections between UE 101 and network 103. For example, network interface 401 may maintain such information in the course of sending and/or receiving traffic to and/or from network 103. The traffic and/or connection attributes may include, for example, a core network type or identifier. For example, network interface 401 may indicate that UE 101 is communicatively coupled to, and/or that network 103 includes, a particular type of core network (e.g., a 5GC, an EPC, and/or other suitable type of core network). As another example, network interface 401 may indicate that UE 101 is communicatively coupled to a particular core network (e.g., based on a core network identifier, a Public Land Mobile Network ("PLMN") identifier, a Data Network Name ("DNN"), etc.). In some scenarios, certain core networks or types of core networks may support network slicing techniques and/or may implement particular network slices, while other core networks or types of core networks may not support network slicing and/or may not implement particular network slices.

In some embodiments, the traffic and/or connection attributes may include a quantity of communication session, such as a quantity of PDU sessions between UE 101 and network 103. Generally, for example, the presence of a single communication session may indicate that UE 101 is connected to network 103 via a default network slice, while the presence of multiple simultaneously established communication sessions between UE 101 and network 103 may indicate that UE 101 is connected to network 103 via one or more network slices that are not a default network slice.

In some embodiments, the traffic and/or connection attributes may include a RAT and/or band via which UE 101 is connected to network 103 (e.g., to a RAN of network 103). For example, some RATs or bands may support network slicing techniques and/or may implement particular network slices, while other RATs or bands may not support network slicing and/or may not implement particular network slices. For example, some RATs or bands may not be capable of delivering QoS (e.g., latency, throughput, etc.) in accordance with particular network slices, while other RATs or bands may capable of delivering QoS in accordance with particular network slices.

In some embodiments, the traffic and/or connection attributes determined or maintained (at 502) by network interface 401 may include one or more other suitable types of traffic and/or connection attributes. Network interface 401 may provide (at 504) the traffic and/or connection attributes to OS/kernel 403.

Additionally, in some embodiments, one or more applications 501 executing at UE 101 may provide (at 506) traffic and/or connection attributes to OS/kernel 403. Such applications 501 may include applications that send and/or receive traffic to and/or from network 103 (e.g., via network interface 401), such as gaming applications, voice call applications, etc. The information provided by such applications 501 may include some or all of the information described above with respect to network interface 401 (e.g., in embodiments where applications 501 receive the information from network interface 401 or some other source).

Additionally, or alternatively, applications 501 may provide (at 506) information indicating an application or service type. For example, a particular application 501 may provide an indication that the particular application 501 is a voice calling application, that application 501 is a gaming application, etc. Additionally, or alternatively, the particular application 501 may provide an indication that application

501 is engaged in, or is receiving, a particular type of service, such as a voice calling service, a gaming service, etc. via network 103. Generally, certain application and/or service types may be associated with particular network slices (e.g., a voice calling service may be associated with a network slice that delivers low latency services).

As another example, applications 501 may provide Key Performance Indicators ("KPIs"), performance metrics, or the like (referred to herein simply as "KPIs" for the sake of brevity). Such KPIs may include, for example, latency metrics, throughput metrics, reliability metrics (e.g., dropped calls or other types of reliability metrics), and/or other suitable KPIs. Applications 501 may, for example, perform tests or other types of measurements in order to determine such KPIs. Generally, KPIs that meet certain thresholds may indicate that UE 101 is communicating with network 103 via one or more network slices that provide service in accordance with such thresholds. For example, a particular network slice may be associated with a particular threshold latency. KPIs indicating that UE 101 is receiving traffic with the threshold latency (or lower) may indicate that UE 101 is potentially connected to network 103 via the particular network slice. On the other hand, if UE 101 is receiving traffic with a higher latency than the threshold latency, then UE 101 may potentially not be connected to network 103 via the particular network slice.

As yet another example, applications 501 may provide QoS parameters to OS/kernel 403. Such QoS parameters may indicate SLAs, thresholds, etc. that are associated with respective applications 501. For example, a voice calling application or a gaming application (e.g., a particular application 501) may indicate a relatively low latency threshold, a content streaming application (e.g., another application 501) may indicate a relatively high throughput threshold, etc. The indication of particular QoS parameters (e.g., thresholds, SLAs, etc.) may potentially indicate that network slices that are able to provide service according to such QoS parameters are being utilized for communications between UE 101 and network 103.

In some embodiments, OS/kernel 403 may receive traffic and/or connection attributes from some other source in addition to, or in lieu of, network interface 401 and/or one or more applications 501. For example, OS/kernel 403 may receive such information from a remote device, such as an application server, an element of network 103, and/or some other source. Further, while examples of traffic and/or connection attributes are described above, in some embodiments, OS/kernel 403 may receive additional or different types of traffic and/or connection attributes.

Figure 6:
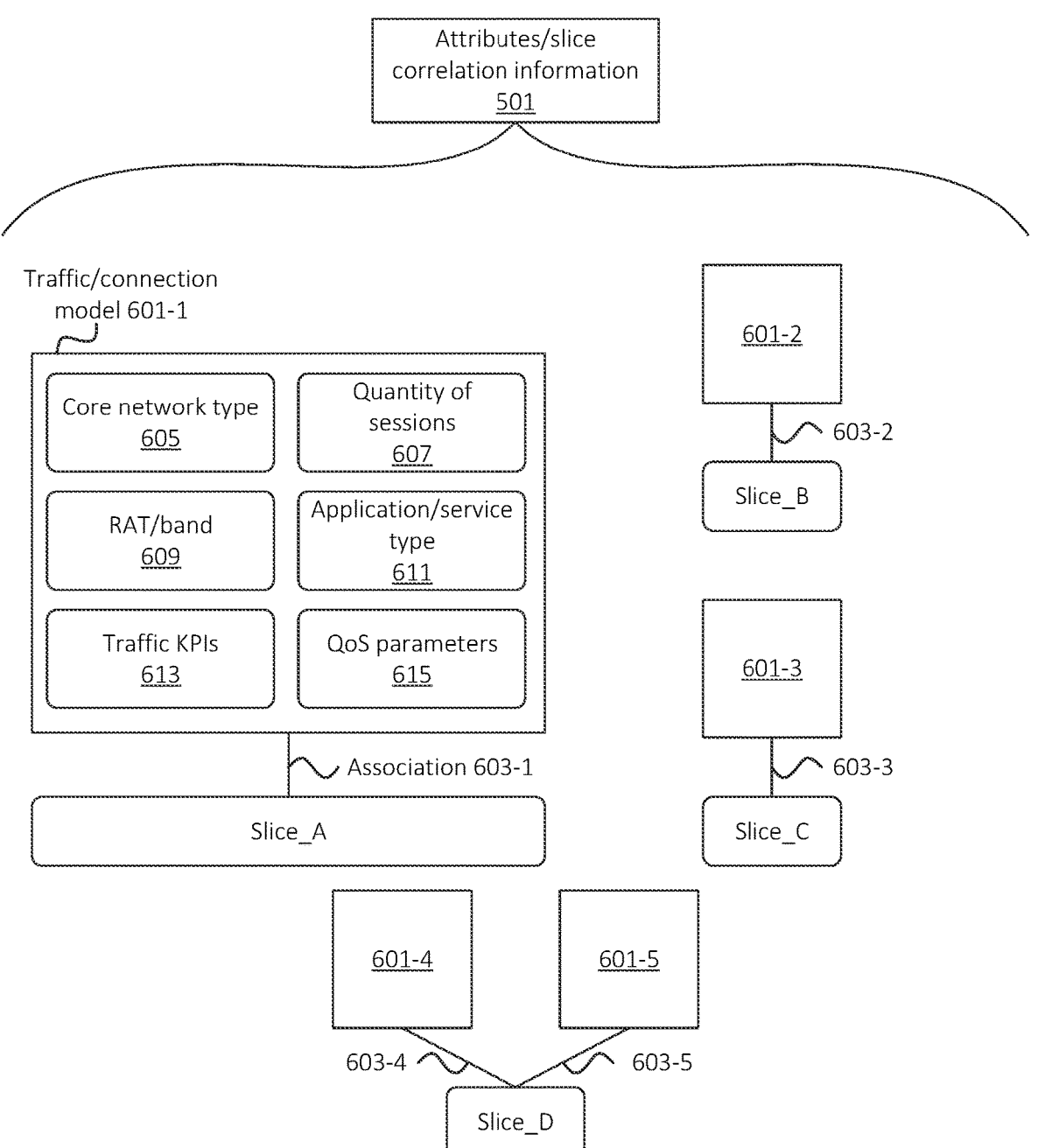
FIG. 6 illustrates example attributes/slice correlation information, in accordance with some embodiments.

OS/kernel 403 may identify (at 508) one or more network slices based on the received (e.g., at 504 and/or 506) traffic and/or connection attributes. For example, OS/kernel 403 may compare the received traffic and/or connection attributes to attributes/slice correlation information 503. OS/kernel 403 may receive attributes/slice correlation information 503 as part of a configuration procedure, an Over-the-Air ("OTA") update procedure, and/or via some other suitable mechanism. As shown in FIG. 6, attributes/slice correlation information 503 may include one or more traffic/connection models 601 (e.g., example traffic/connection models 601-1 through 601-5, as shown in FIG. 6). Traffic/connection models 601 may be generated, refined, trained, etc. (e.g., by OS/kernel 403 and/or some other application, device, or system) using artificial intelligence/machine learning ("AI/ML") techniques or other suitable techniques.

Each traffic/connection model 601 may include a respective association 603 with a respective network slice. For example, attributes/slice correlation information 503 indicates association 603-1 between traffic/connection model 601-1 and Slice_A (e.g., traffic/connection model 601-1 is associated with Slice_A), association 603-2 between traffic/connection model 601-2 and Slice_B, association 603-3 between traffic/connection model 601-3 and Slice_C, association 603-4 between traffic/connection model 601-4 and Slice_D, and association 603-5 between traffic/connection model 601-5 and Slice_D (e.g., traffic/connection models 601-4 and 601-5 are both associated with Slice_D). Each association 603 may include a score, an affinity, a likelihood, etc. that indicates that input data (e.g., a set of received traffic/connection attributes) matching a respective traffic/connection model 601 is associated with a respective network slice. In some embodiments, associations 603 may be generated, refined, etc. using AI/ML techniques or other suitable techniques.

Each traffic/connection model 601 may include particular values or ranges of values that correspond to particular different types of information, such as core network type information 605, quantity of sessions information 607, RAT/band information 609, application/service type information 611, traffic KPIs 613, QoS parameters 615, and/or additional or different types of information. For example, as discussed above, different values for these different types of information (e.g., traffic/connection attributes) may indicate the utilization of different respective network slices between UE 101 and network 103. As such, a set of input data (e.g., received traffic/connection attributes) that matches a respective traffic/connection model 601 may thus indicate (e.g., based on a corresponding association 603) the usage of an associated network slice. When identifying (at 508) a respective network slice based on received (e.g., at 504 and/or 506) traffic and/or connection attributes, OS/kernel 403 may utilize a suitable similarity analysis to identify a respective traffic/connection model 601 that matches (e.g., is similar beyond a suitable similarity threshold, pursuant to the similarity analysis) the traffic and/or connection attributes.

Returning to FIG. 5, once OS/kernel 403 has determined (at 508) the network slice (or slices) associated with UE 101, OS/kernel 403 may identify (at 510) the respective slice indicator (or indicators) associated with the determined one or more network slices. For example, as similarly noted above, the respective slice indicators may include images, icons, graphics, and/or other suitable types of indicators. OS/kernel 403 may accordingly provide (at 512) the identified one or more slice indicators to user interface/application 407, which may present (at 514) the one or more slice indicators, as similarly discussed above.

In some embodiments, similar to the identification (e.g., based on network slice information provided (at 404) by network interface 401 and/or traffic/connection attributes provided (at 504 and/or 506) from network interface 401 and/or applications 501) that UE 101 is connected to network 103 via a particular network slice, OS/kernel 403 may further identify situations in which UE 101 is not connected to network 103 via such network slice. For example, UE 101 may determine that a communication session, via the particular network slice, has ceased, ended, been de-established, etc. Such situation may occur, for example, when a service associated with such network slice is no longer being used, such as the end of a voice call, the termination of a gaming session, the conclusion of streamed content, the completion of a file transfer, etc. In such scenarios, OS/kernel 403 may determine that a slice indicator associated with such network slice should no longer be presented, and OS/kernel 403 may instruct user interface/application 407 to cease presenting such slice indicator (e.g., remove an icon, graphic, etc. that was used to indicate the particular network slice).

FIG. 7 illustrates an example process 700 for presenting a slice indicator indicating a particular network slice with which a given UE 101 is associated. In some embodiments, some or all of process 700 may be performed by UE 101 (e.g., by OS/kernel 403 and/or some other component or function of UE 101).

As shown, process 700 may include maintaining (at 702) slice/indicator correlation information. For example, as discussed above, UE 101 (e.g., OS/kernel 403 and/or some other function, application, etc. of UE 101) may maintain slice/indicator correlation information 405. UE 101 may maintain such information in a local storage of UE 101. In some embodiments, slice/indicator correlation information 405 may be maintained as a logical or embedded component of OS/kernel 403 and/or may otherwise be accessible by OS/kernel 403 of UE 101. In some embodiments, slice/indicator correlation information 405 may be generated or refined (e.g., by OS/kernel 403 and/or by some other application, device, or system) iteratively or over time, such as via AI/ML techniques or other suitable techniques. As discussed above, slice/indicator correlation information 405 may associate different network slices with different slice indicators, such as images, icons, texts, notification types (e.g., pop-up notifications, persistent notifications, etc.), audible alerts, etc.

Process 700 may further include maintaining (at 704) attributes/slice correlation information. For example, as discussed above, UE 101 may maintain attributes/slice correlation information 503, which associates respective sets of traffic/connection attributes (e.g., traffic/connection models 601) with respective network slices. UE 101 may maintain such information in a local storage of UE 101. In some embodiments, attributes/slice correlation information 503 may be maintained as a logical or embedded component of OS/kernel 403 and/or may otherwise be accessible by OS/kernel 403 of UE 101. In some embodiments, attributes/slice correlation information 503 may be generated or refined (e.g., by OS/kernel 403 and/or by some other application, device, or system) iteratively or over time, such as via AI/ML techniques or other suitable techniques. As discussed above, attributes/slice correlation information 503 may associate respective values associated with different types of traffic/connection attribute information, which may be received from network interface 401 of UE 101 and/or one or more applications 501 executing at UE 101, with respective network slices of network 103.

Process 700 may also include receiving (at 706) traffic/connection attribute information. For example, as discussed above, UE 101 may identify attributes of traffic sent and/or received by UE 101 via network 103, and/or may identify attributes of a connection between UE 101 and network 103 (e.g., attributes of a wireless connection between UE 101 and a RAN of network 103). As discussed above, the traffic/connection attribute information may be provided by network interface 401, one or more applications 501, and/or some other suitable source. Network interface 401 and/or applications 501 may provide such information via one or more APIs or other suitable communication pathways (e.g., to OS/kernel 403 of UE 101 and/or to an application or some other resource of UE 101). As discussed above, such attributes may include core network type information 605, quantity of sessions information 607, RAT/band information 609, application/service type information 611, traffic KPIs 613, QoS parameters 615, and/or additional or different types of information.

In some embodiments, process 700 may include receiving (at 708) network slice information. For example, network interface 401 of UE 101 may provide a direct indication of one or more network slices associated with UE 101 (e.g., associated with communication sessions between UE 101 and a core of network 103, such as PDU sessions between UE 101 and a 5GC). Such indication may include a network slice identifier, such as a NSSAI value or other suitable value. In some embodiments, process 700 may include operation 708 in addition to, or in lieu of, operations 704 and/or 706.

Process 700 may further include identifying (at 710) a connection to network 103 via a particular network slice based on the received information. For example, as discussed above, UE 101 may identify one or more traffic/connection models 601 that match (e.g., are similar beyond at least a similarity threshold in accordance with a suitable similarity analysis) traffic/connection attribute information (e.g., as received at 706). Additionally, or alternatively, UE 101 may identify, based on information received (at 708) from network interface 401, that UE 101 is connected to network 103 via the particular network slice. In some embodiments, UE 101 may determine that UE 101 is connected to network 103 via the particular network slice based on both network slice information (as received at 708) and traffic/connection attribute information (received at 706).

For example, in some embodiments, UE 101 may verify that traffic/connection attribute information (received at 706) matches (e.g., meets or exceeds) QoS parameters or SLAs associated with an indicated (e.g., at 708) network slice. Situations may occur, for example, such as situations of network congestion, outages, etc., which may cause actual QoS metrics (e.g., latency, throughput, etc.) to fall below QoS thresholds, SLAs, etc. associated with a given network slice. In such situations, even if UE 101 is connected to network 103 via a given network slice, actual service may not meet or exceed the QoS thresholds, SLAs, etc. associated with the given network slice, and evaluating the actual measured traffic/connection attribute information may be used to determine that such QoS thresholds, SLAs, etc. are not met. Thus, in such situations, even if UE 101 is connected to network 103 via a given network slice, UE 101 may refrain from identifying (e.g., at 710 and/or at subsequent operations) that a slice indicator associated with a given network slice should be presented.

Further, in some embodiments, in such situations, UE 101 may generate one or more reports or alerts indicating that the QoS thresholds, SLAs, etc. associated with the given network slice are not being met. Such reports, alerts, etc. may be provided to a user of UE 101 (e.g., via UI 105), may be sent via message (e.g., Short Message Service ("SMS") message, email, or other suitable message type) to a network operator or administrator of network 103, or to some other device or system. In this manner, corrective action may be taken with respect network 103, such as adjusting network parameters, to remedy the QoS parameters, SLAs, etc. of the given network slice not being met.

Process 700 may additionally include identifying (at 712) a slice indicator based on the identified network slice. For example, UE 101 may identify an icon, a graphic, etc. indicated by slice/indicator correlation information 405 as being associated with the identified network slice. In some embodiments, UE 101 may identify a notification type, such as a persistent notification, a pop-up notification, etc. associated with the identified network slice or the identified slice indicator.

Process 700 may also include presenting (at 714) the identified slice indicator. For example, as discussed above, UE 101 may present the slice indicator via a notification panel, an icon, a taskbar, etc. In some embodiments, the manner in which the slice indicator is presented (e.g., via a pop-up notification, a persistent notification, etc.) may be indicated by slice/indicator correlation information 405, where different network slices or slice indicators may be associated with different manners of presentation.

As discussed above, UE 101 may determine, at a subsequent time, when UE 101 is no longer connected to network 103 via the particular network slice, and may cease presenting the slice indicator based on determining that UE 101 is no longer connected to network 103 via the particular network slice. For example, UE 101 may continue to monitor or receive (e.g., at 706 and/or 708) information based on which UE 101 may determine via which network slice, or slices, UE 101 is communicating with network 103.

Figure 8:
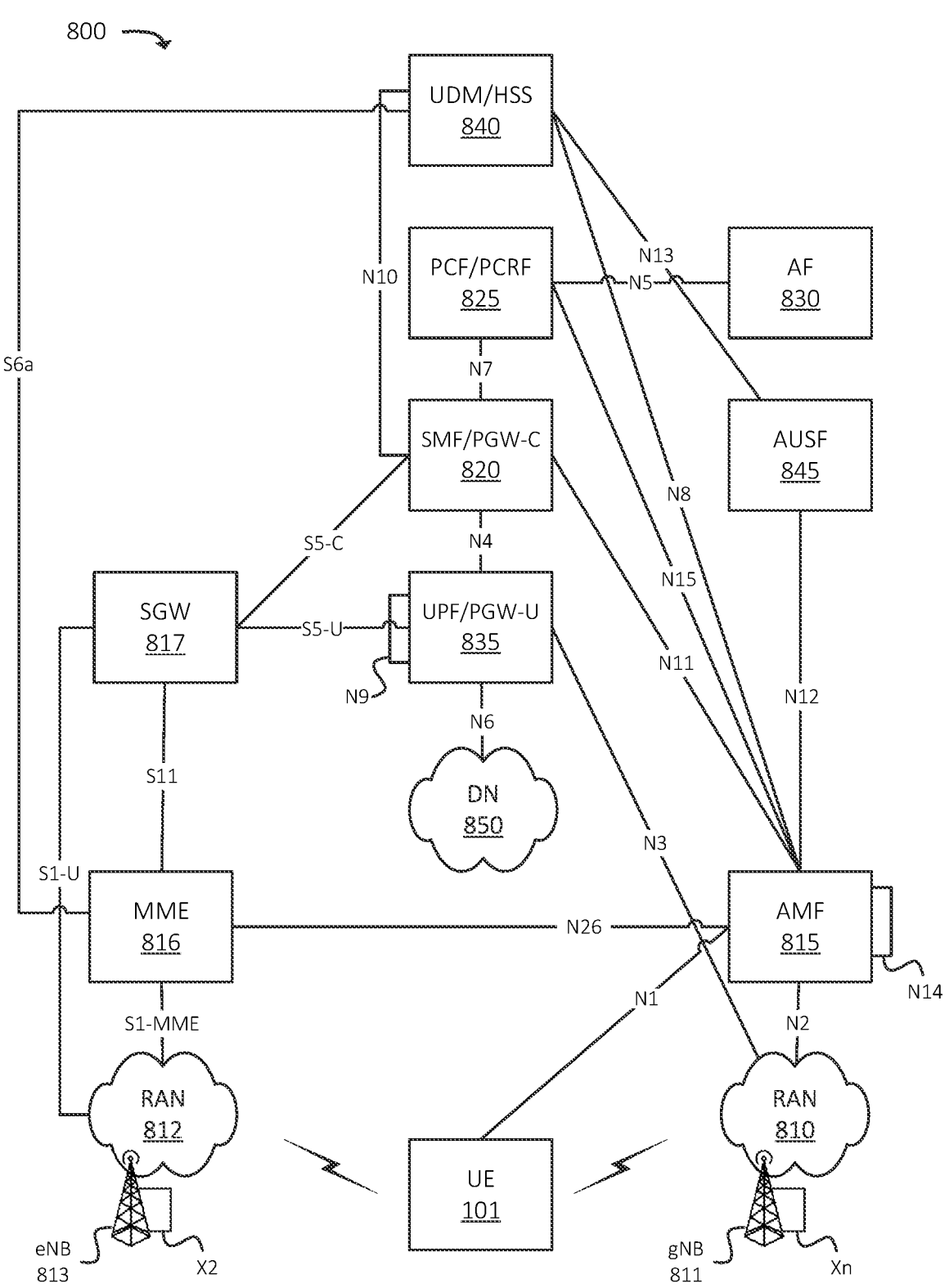
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G NSA architecture, in which a 5G RAT may be used in conjunction with one or more other RATs (e.g., an LTE RAT), and/or in which elements of a 5G core network may be implemented by, may be communicatively coupled with, and/or may include elements of another type of core network (e.g., an EPC). In some embodiments, portions of environment 800 may represent or may include a 5GC. As shown, environment 800 may include UE 101, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850).

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF/PGW-C 820, PCF/PCRF 825, UPF/PGW-U 835, UDM/HSS 840, and/or AUSF 845, while another slice may include a second instance of SMF/PGW-C 820, PCF/PCRF 825, UPF/PGW-U 835, UDM/HSS 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 800 may be, may include, may be implemented by, and/or may be communicatively coupled to network 103.

UE 101 may include a computation and communication device, such as a wireless mobile communication device that is capable of communicating with RAN 810, RAN 812, and/or DN 850. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 101 may communicate with one or more other elements of environment 800. UE 101 may communicate with RAN 810 via an air interface (e.g., as provided by gNB 811). For instance, RAN 810 may receive traffic (e.g., user plane traffic such as voice call traffic, data traffic, messaging traffic, etc.) from UE 101 via the air interface, and may communicate the traffic to UPF/PGW-U 835 and/or one or more other devices or networks. Further, RAN 810 may receive signaling traffic, control plane traffic, etc. from UE 101 via the air interface, and may communicate such signaling traffic, control plane traffic, etc. to AMF 815 and/or one or more other devices or networks. Additionally, RAN 810 may receive traffic intended for UE 101 (e.g., from UPF/PGW-U 835, AMF 815, and/or one or more other devices or networks) and may communicate the traffic to UE 101 via the air interface.

RAN 812 may be, or may include, a LTE RAN that includes one or more base stations (e.g., one or more eNBs 813), via which UE 101 may communicate with one or more other elements of environment 800. UE 101 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 101 via the air interface, and may communicate the traffic to UPF/PGW-U 835 (e.g., via SGW 817) and/or one or more other devices or networks. Further, RAN 812 may receive signaling traffic, control plane traffic, etc. from UE 101 via the air interface, and may communicate such signaling traffic, control plane traffic, etc. to MME 816 and/or one or more other devices or networks. Additionally, RAN 812 may receive traffic intended for UE 101 (e.g., from UPF/PGW-U 835, MME 816, SGW 817, and/or one or more other devices or networks) and may communicate the traffic to UE 101 via the air interface.

AMF 815 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 101. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 101, from DN 850, and may forward the user plane data toward UE 101 (e.g., via RAN 810, SMF/PGW-C 820, and/or one or more other devices). In some embodiments, multiple UPFs 835 may be deployed (e.g., in different geographical locations), and the delivery of content to UE 101 may be coordinated via the N9 interface (e.g., as denoted in FIG. 8 by the line marked "N9" originating and terminating at UPF/PGW-U 835). Similarly, UPF/PGW-U 835 may receive traffic from UE 101 (e.g., via RAN 810, RAN 812, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 101.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 101 may communicate, through DN 850, with data servers, other UEs 101, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 101 may communicate.

Figure 9:
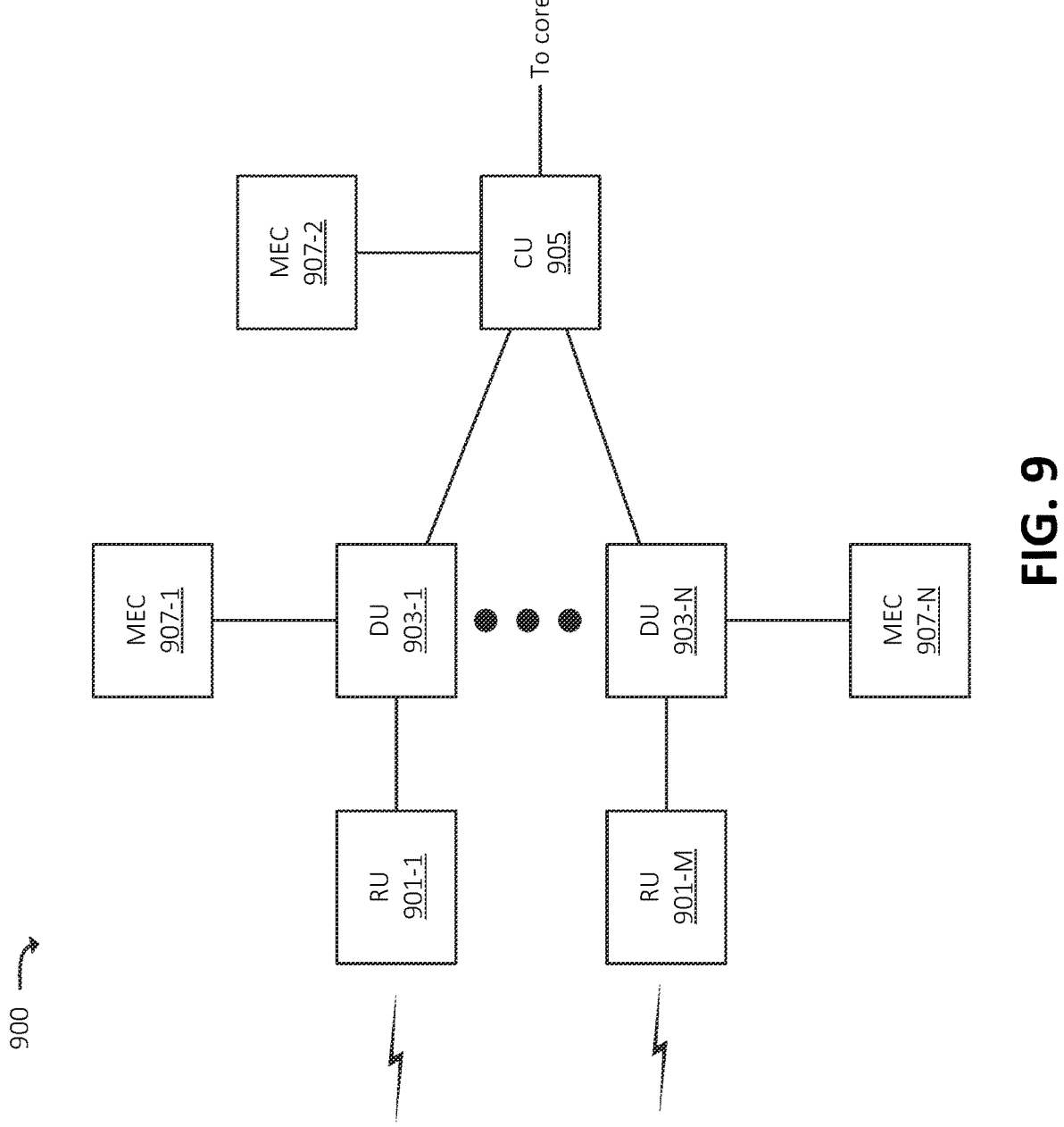
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 810, RAN 812, or some other RAN). In some embodiments, a particular RAN may include one RAN environment 900. In some embodiments, a particular RAN may include multiple RAN environments 900. In some embodiments, RAN environment 900 may correspond to a particular gNB 811 of a 5G RAN (e.g., RAN 810). In some embodiments, RAN environment 900 may correspond to multiple gNBs 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

One or more elements of RAN environment 900 may, in some embodiments, be communicatively coupled to one or more Multi-Access/Mobile Edge Computing ("MEC") devices, referred to sometimes herein simply as "MECs" 907. For example, DU 903-1 may be communicatively coupled to MEC 907-1, DU 903-N may be communicatively coupled to MEC 907-N, CU 905 may be communicatively coupled to MEC 907-2, and so on. MECs 907 may include hardware resources (e.g., configurable or provisionable hardware resources) that may be configured to provide services and/or otherwise process traffic to and/or from UE 101, via a respective RU 901.

For example, DU 903-1 may route some traffic, from UE 101, to MEC 907-1 instead of to a core network via CU 905. MEC 907-1 may process the traffic, perform one or more computations based on the received traffic, and may provide traffic to UE 101 via RU 901-1. In some embodiments, MEC 907 may include, and/or may implement, some or all of the functionality described above with respect to AF 830, UPF 835, and/or one or more other devices, systems, VNFs, CNFs, etc. In this manner, ultra-low latency services may be provided to UE 101, as traffic does not need to traverse DU 903, CU 905, links between DU 903 and CU 905, and an intervening backhaul network between RAN environment 900 and the core network.

Figure 10:
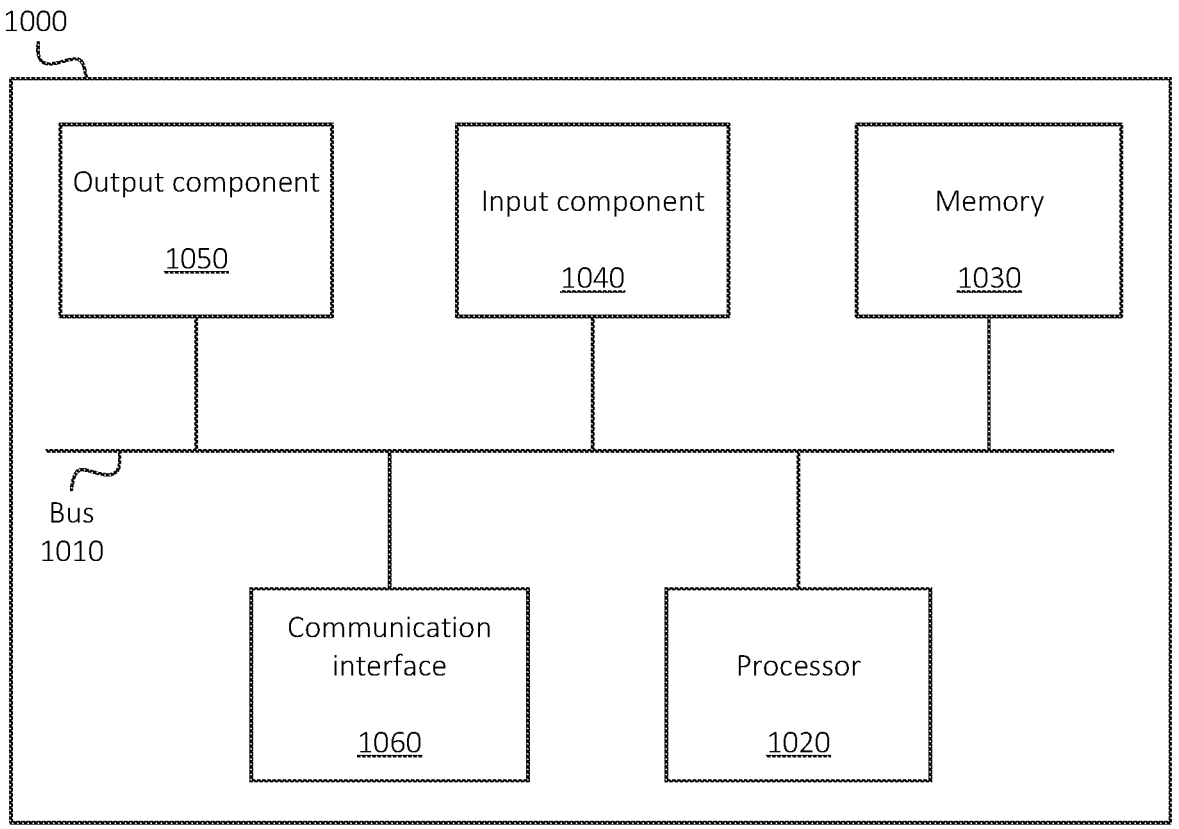
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, and 2-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or,"

as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify that the device is communicatively coupled to a wireless network via a particular network slice;
identify a slice indicator icon associated with the particular network slice;
present the slice indicator icon via a user interface of the device, wherein presenting the slice indicator icon via the user interface of the device includes presenting, in a notification panel presented by the device, the slice indicator icon and at least one of:
a clock,
a network connectivity quality indicator icon, or
a battery indicator icon;
subsequently identify that the device is not communicatively coupled to the wireless network via the particular network slice; and
remove the slice indicator icon from the notification panel based on identifying that the device is not communicatively coupled to the wireless network via the particular network slice, wherein removing the slice indicator icon includes presenting, in the notification panel, the at least one of the clock, the network connectivity quality indicator icon, or the battery indicator icon.

2. The device of claim 1, wherein the one or more processors are further configured to:
receive an identifier of the particular network slice from a network interface of the device, wherein identifying that the device is communicatively coupled to the wireless network via the particular network slice is based on receiving the identifier of the particular network slice.

3. The device of claim 2, wherein the identifier of the particular network slice includes a Network Slice Selection Assistance Information ("NSSAI") value associated with the particular network slice.

4. The device of claim 1, wherein the one or more processors are further configured to:
identify attributes of traffic communicated between the device and the wireless network, wherein identifying that the device is communicatively coupled to the wireless network via the particular network slice is based on the identified attributes of the traffic communicated between the device and the wireless network.

5. The device of claim 1, wherein the one or more processors are further configured to:
identify attributes of a wireless connection between device and a radio access network ("RAN") of the wireless network, wherein identifying that the device is communicatively coupled to the wireless network via the particular network slice is based on the identified attributes of the wireless connection between the device and the RAN of the wireless network.

6. The device of claim 5, wherein the attributes of the wireless connection include a radio access technology ("RAT") or band associated with the wireless connection between the device and the RAN of the wireless network.

7. The device of claim 1, wherein the slice indicator icon, associated with the particular network slice, is a first slice indicator icon that is different from a second slice indicator icon that is associated with a different network slice.

8. A non-transitory computer-readable medium, storing a plurality of processor-executable instructions to:

identify that a device is communicatively coupled to a wireless network via a particular network slice;

identify a slice indicator icon associated with the particular network slice;

present the slice indicator icon via a user interface of the device, wherein presenting the slice indicator icon via the user interface of the device includes presenting, in a notification panel presented by the device, the slice indicator icon and at least one of:

a clock, a network connectivity quality indicator icon, or a battery indicator icon;

subsequently identify that the device is not communicatively coupled to the wireless network via the particular network slice; and remove the slice indicator icon from the notification panel based on identifying that the device is not communicatively coupled to the wireless network via the particular network slice, wherein removing the slice indicator icon includes presenting, in the notification panel, the at least one of the clock, the network connectivity quality indicator icon, or the battery indicator icon.

9. The non-transitory computer-readable medium of claim 8, wherein the plurality of processor-executable instructions further include processor-executable instructions to:

receive an identifier of the particular network slice from a network interface of the device, wherein identifying that the device is communicatively coupled to the wireless network via the particular network slice is based on receiving the identifier of the particular network slice.

10. The non-transitory computer-readable medium of claim 9, wherein the identifier of the particular network slice includes a Network Slice Selection Assistance Information ("NSSAI") value associated with the particular network slice.

11. The non-transitory computer-readable medium of claim 8, wherein the plurality of processor-executable instructions further include processor-executable instructions to:

identify attributes of traffic communicated between the device and the wireless network, wherein identifying that the device is communicatively coupled to the wireless network via the particular network slice is based on the identified attributes of the traffic communicated between the device and the wireless network.

12. The non-transitory computer-readable medium of claim 8, wherein the plurality of processor-executable instructions further include processor-executable instructions to:

identify attributes of a wireless connection between device and a radio access network ("RAN") of the wireless network, wherein identifying that the device is communicatively coupled to the wireless network via the particular network slice is based on the identified attributes of the wireless connection between the device and the RAN of the wireless network.

13. The non-transitory computer-readable medium of claim 12, wherein the attributes of the wireless connection include a radio access technology ("RAT") or band associated with the wireless connection between the device and the RAN of the wireless network.

14. The non-transitory computer-readable medium of claim 8, wherein the slice indicator icon, associated with the particular network slice, is a first slice indicator icon that is different from a second slice indicator icon that is associated with a different network slice.

15. A method, comprising:

identifying that a device is communicatively coupled to a wireless network via a particular network slice;

identifying a slice indicator icon associated with the particular network slice;

presenting the slice indicator icon via a user interface of the device, wherein presenting the slice indicator icon via the user interface of the device includes presenting, in a notification panel presented by the device, the slice indicator icon and at least one of:

a clock, a network connectivity quality indicator icon, or a battery indicator icon;

subsequently identifying that the device is not communicatively coupled to the wireless network via the particular network slice; and removing the slice indicator icon from the notification panel based on identifying that the device is not communicatively coupled to the wireless network via the particular network slice, wherein removing the slice indicator icon includes presenting, in the notification panel, the at least one of the clock, the network connectivity quality indicator icon, or the battery indicator icon.

16. The method of claim 15, further comprising:

receiving a Network Slice Selection Assistance Information ("NSSAI") value associated with the particular network slice from a network interface of the device, wherein identifying that the device is communicatively coupled to the wireless network via the particular network slice is based on receiving the NSSAI value associated with the particular network slice.

17. The method of claim 15, further comprising:

identifying attributes of traffic communicated between the device and the wireless network, wherein identifying that the device is communicatively coupled to the wireless network via the particular network slice is based on the identified attributes of the traffic communicated between the device and the wireless network.

18. The method of claim 15, further comprising:

identifying attributes of a wireless connection between device and a radio access network ("RAN") of the wireless network, wherein identifying that the device is communicatively coupled to the wireless network via the particular network slice is based on the identified attributes of the wireless connection between the device and the RAN of the wireless network.

19. The method of claim 18, wherein the attributes of the wireless connection include a radio access technology ("RAT") or band associated with the wireless connection between the device and the RAN of the wireless network.

20. The method of claim 15, wherein the slice indicator icon, associated with the particular network slice, is a first slice indicator icon that is different from a second slice indicator icon that is associated with a different network slice.

* * * * *